(12) United States Patent
Han et al.

(10) Patent No.: US 8,345,195 B2
(45) Date of Patent: Jan. 1, 2013

(54) LIQUID CRYSTAL DISPLAY

(75) Inventors: Kyoung-Tai Han, Suwon-si (KR); Eun-Guk Lee, Seoul (KR); Dong-Yoon Kim, Seoul (KR); Hyung-Jun Park, Seongnam-si (KR)

(73) Assignee: Samsung Display Co., Ltd., Yongin (KR)

( * ) Notice: Subject to any disclaimer, the term of this patent is extended or adjusted under 35 U.S.C. 154(b) by 426 days.

(21) Appl. No.: 12/765,542

(22) Filed: Apr. 22, 2010

(65) Prior Publication Data

US 2011/0090443 A1   Apr. 21, 2011

(30) Foreign Application Priority Data

Oct. 20, 2009  (KR) .................... 10-2009-0099913

(51) Int. Cl.
    *G02F 1/1337*   (2006.01)
    *G02F 1/1339*   (2006.01)
(52) U.S. Cl. .................... 349/124; 349/153; 349/123
(58) Field of Classification Search .................... 349/123, 349/124, 153, 154, 155, 156, 157, 158
    See application file for complete search history.

(56) References Cited

U.S. PATENT DOCUMENTS

| | | | | |
|---|---|---|---|---|
| 6,163,357 A * | 12/2000 | Nakamura | .................... | 349/155 |
| 6,621,548 B2 * | 9/2003 | Freeman | .................... | 349/155 |
| 6,859,249 B2 * | 2/2005 | Freeman | .................... | 349/155 |
| 7,528,921 B2 * | 5/2009 | Ahn et al. | .................... | 349/153 |
| 2005/0286006 A1 * | 12/2005 | Yanagawa | .................... | 349/153 |
| 2007/0285612 A1 | 12/2007 | Cho et al. | | |
| 2008/0036956 A1 | 2/2008 | Tung et al. | | |
| 2008/0158496 A1 * | 7/2008 | Kim et al. | .................... | 349/151 |
| 2011/0090443 A1 * | 4/2011 | Han et al. | .................... | 349/124 |

FOREIGN PATENT DOCUMENTS

| | | |
|---|---|---|
| JP | 11-142888 | 5/1999 |
| JP | 2007-121687 | 5/2007 |
| JP | 2008-225511 | 9/2008 |
| JP | 2009-003437 | 1/2009 |
| JP | 2009-025803 | 2/2009 |
| KR | 2006-0134504 | 12/2006 |
| KR | 2007-0025430 | 3/2007 |
| KR | 2008-0063016 | 7/2008 |

* cited by examiner

*Primary Examiner* — Brian Healy
(74) *Attorney, Agent, or Firm* — H.C. Park & Associates, PLC

(57) ABSTRACT

The present invention relates to a liquid crystal display. The liquid crystal display includes a first substrate and a second substrate facing each other; a liquid crystal layer interposed between the first substrate and the second substrate; a sealant coupling the first substrate and the second substrate and enclosing the liquid crystal layer; a display signal line arranged on the first substrate and including an end portion; and a first spacer disposed between the end portion of the display signal line and the sealant. The liquid crystal layer includes liquid crystal molecules exhibiting a pretilt alignment with respect to the first and second substrates.

19 Claims, 18 Drawing Sheets

LIQUID CRYSTAL DISPLAY

CROSS REFERENCE TO RELATED APPLICATION

This application claims priority from and the benefit of Korean Patent Application No. 10-2009-0099913, filed on Oct. 20, 2009, which is hereby incorporated by reference for all purposes as if fully set forth herein.

BACKGROUND OF THE INVENTION

1. Field of the Invention

Exemplary embodiments of the present invention relates to a liquid crystal display.

2. Discussion of the Background

Liquid crystal displays (LCDs) are now widely used as one type of flat panel display. An LCD has two display panels on which field-generating electrodes such as pixel is electrodes and a common electrode are arranged, and a liquid crystal layer is interposed between the panels. In an LCD, voltages are applied to the field-generating electrodes to generate an electric field through the liquid crystal layer, and the magnitude of an alignment of liquid crystal (LC) molecules of the liquid crystal layer is determined by the electric field strength. Accordingly, the polarization of incident light is controlled via the interaction of the polarized light with the aligned liquid crystal molecules, thereby performing image display.

A vertical alignment (VA) mode LCD aligns the major axes of the liquid crystal molecules perpendicular to the plane of the display panel in the absence of an applied electric field. In a VA mode LCD, a wide viewing angle may be realized by forming cutouts such as minute slits in the field-generating electrodes and by forming protrusions on the field-generating electrodes. Since the electric field established by conductive surfaces with such cutouts and protrusions determines the tilt directions of the liquid crystal molecules, the tilt directions may be spatially distributed into various directions by using various patterns of the cutouts or protrusions such that the reference viewing angle may be enhanced.

In the manufacturing process of an LCD, thin film patterns of a multi-layered structure may be applied on a mother substrate through deposition or photolithographic processes, and a plurality of substrates, i.e., a plurality of cells, may be formed by cutting the mother substrate into unit cells to manufacture the display devices. When voltage is applied to the field-generating electrodes of the individual unit cells in the initial alignment of the liquid crystal molecules, ultraviolet light may be used to irradiate the unit cell to produce alignment of the liquid crystal molecules, which typically requires a lot of time and equipment and causes low LCD production yields.

Also, if the initial alignment of the liquid crystal is not well established, the is response speed of the liquid crystal is decreased and the uniformity quality of the liquid crystal display may be deteriorated.

SUMMARY OF THE INVENTION

Exemplary embodiments of the present invention provide an LCD that offers pre-aligned liquid crystal molecules that may be produced in a highly uniform and bulk production process.

Additional features of the invention will be set forth in the description which follows, an in part will be apparent from the description, or may be learned by practice of the invention.

An exemplary embodiment of the present invention discloses a liquid crystal display comprising a first substrate and a second substrate facing each other; a liquid crystal layer interposed between the first substrate and the second substrate; a sealant coupling the first substrate and the second substrate and enclosing the liquid crystal layer; a display signal line arranged on the first substrate and comprising an end portion; and a first spacer disposed between the end portion of the display signal line and the sealant.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, is illustrate embodiments of the invention, and together with the description serve to explain the principles of the invention.

DETAILED DESCRIPTION OF THE ILLUSTRATED EMBODIMENTS

Figure 1:
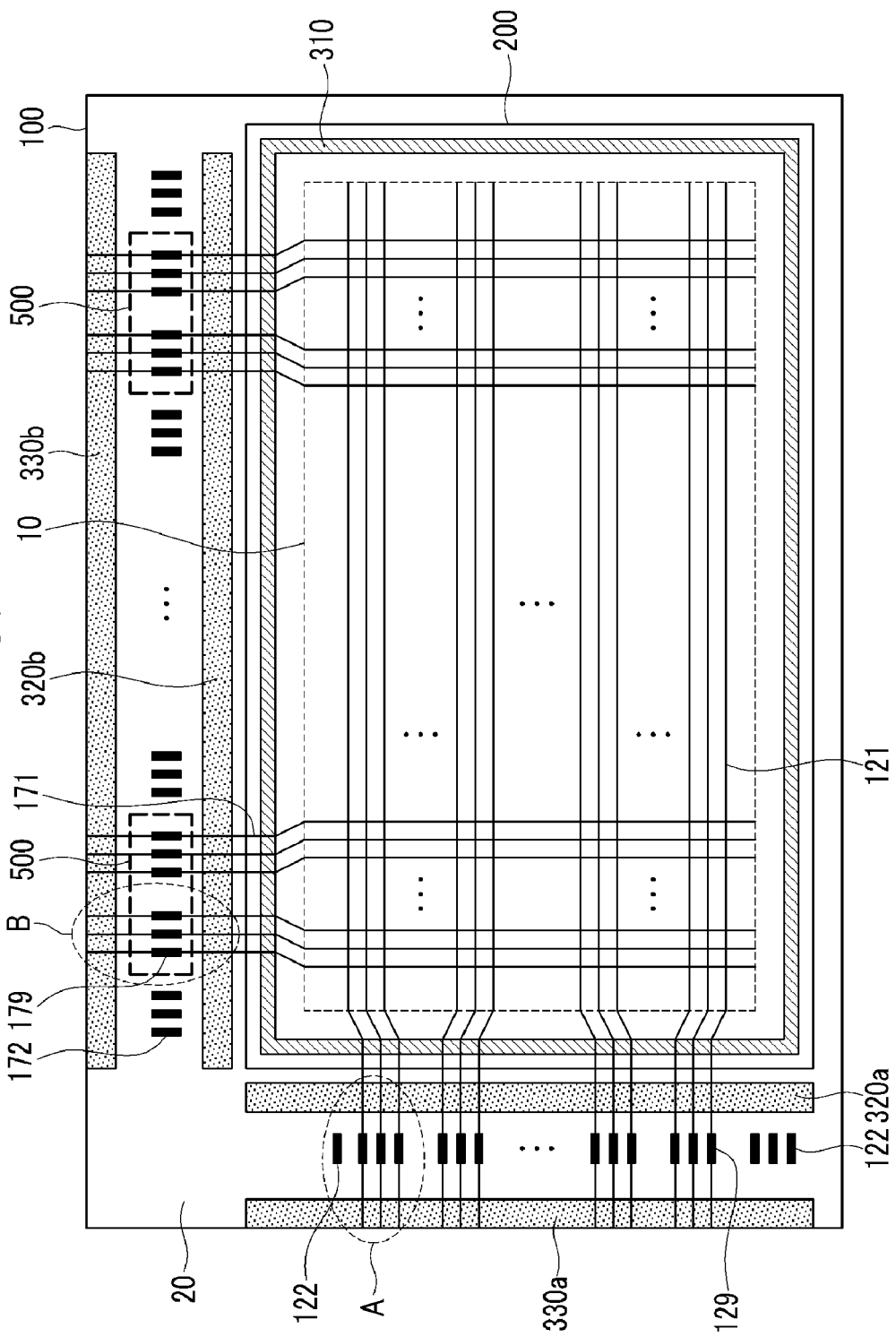
FIG. 1 is a plan view of an LCD according to an exemplary embodiment of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

It will be understood that when an element or layer is referred to as being "on" or "connected to" another element or layer, it can be directly on or directly connected to the other element or layer, or intervening elements or layers may be present. In contrast, when an element is referred to as being "directly on" or "directly connected to" another element or layer, there are no intervening elements or layers present.

A liquid crystal display (LCD) according to an exemplary embodiment of the present invention will be described with reference to FIG. 1, FIG. 2, FIG. 3, FIG. 4, FIG. 5, FIG. 6, and FIG. 7.

Figure 2:
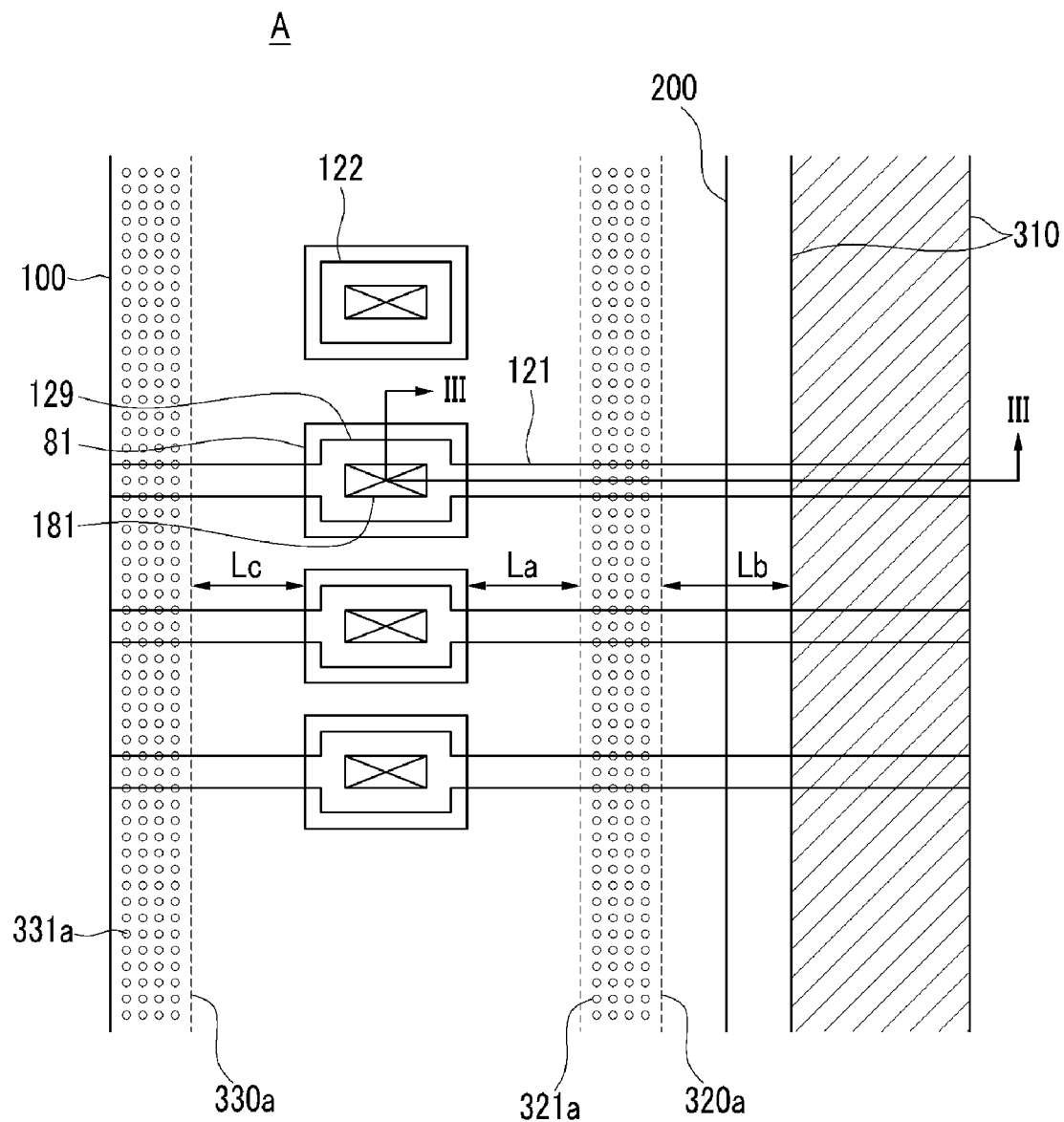
FIG. 2 is an enlarged plan view of portion A of the LCD shown in FIG. 1.
Figure 3:
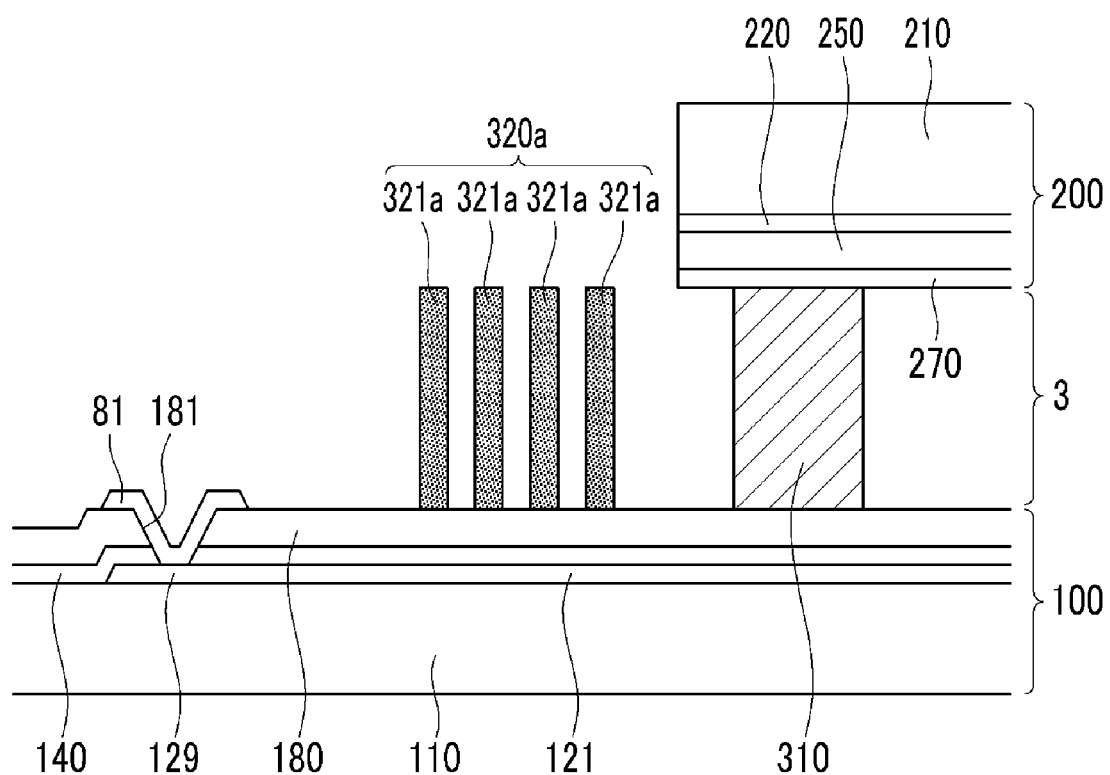
FIG. 3 is a cross-sectional view of the LCD shown in FIG. 2 taken along the line III-III.
Figure 4:
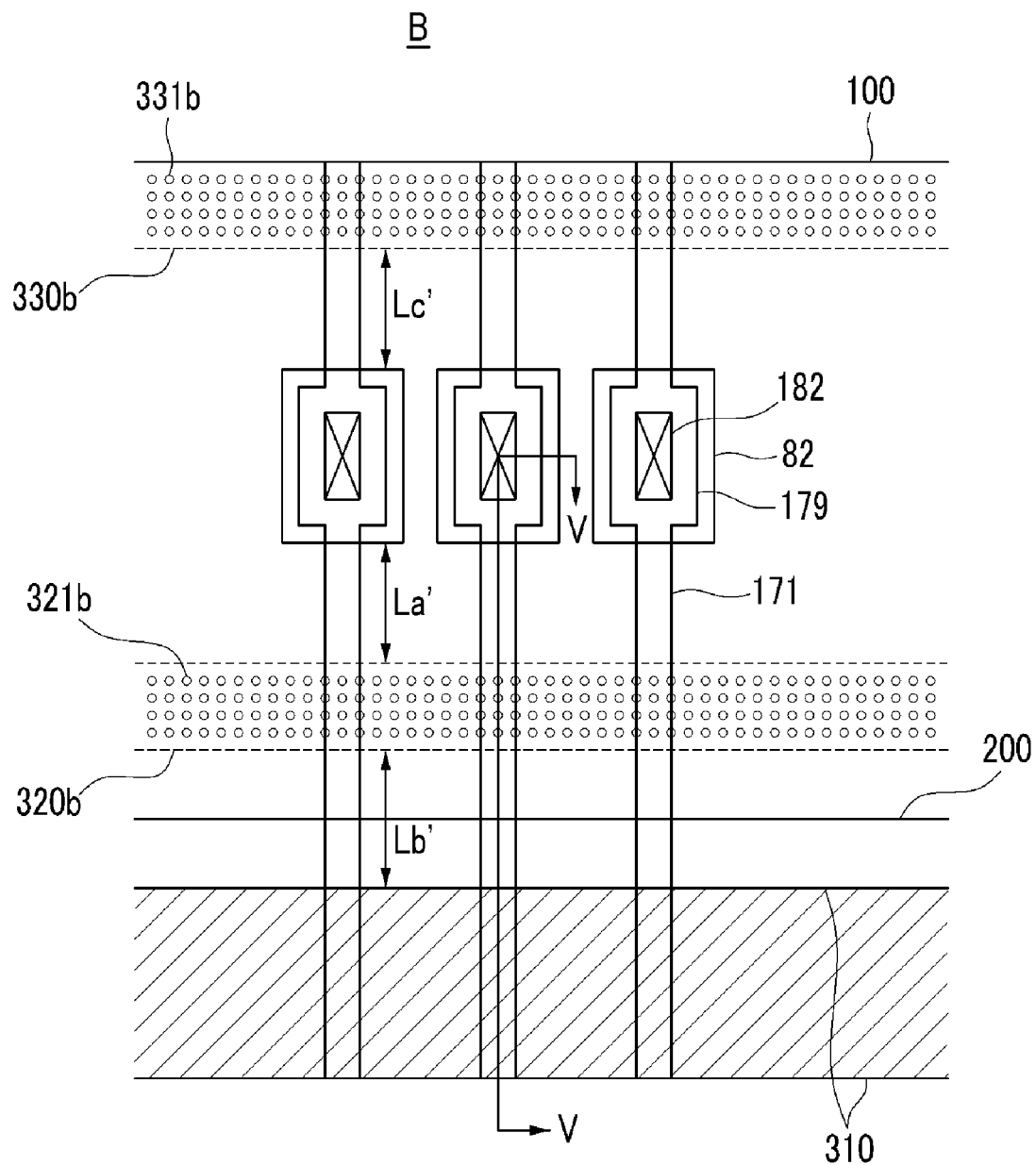
FIG. 4 is an enlarged plan view of portion B of the LCD shown in FIG. 1.
Figure 5:
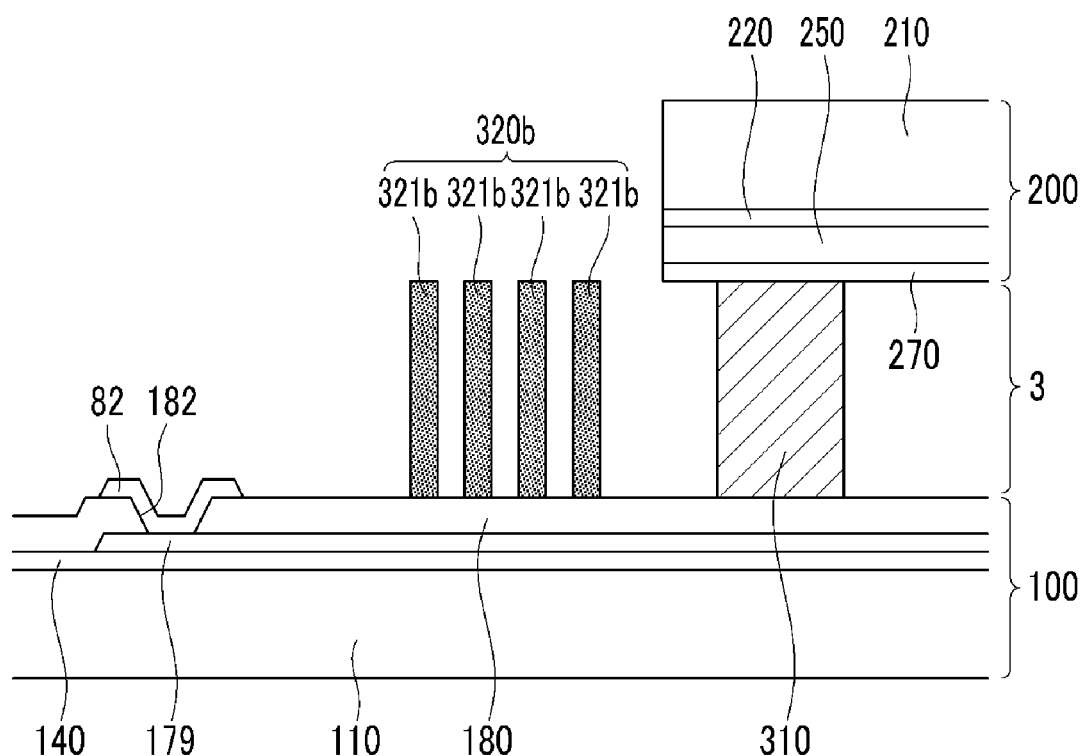
FIG. 5 is a cross-sectional view of the LCD shown in FIG. 4 taken along the line V-V.
Figure 6:
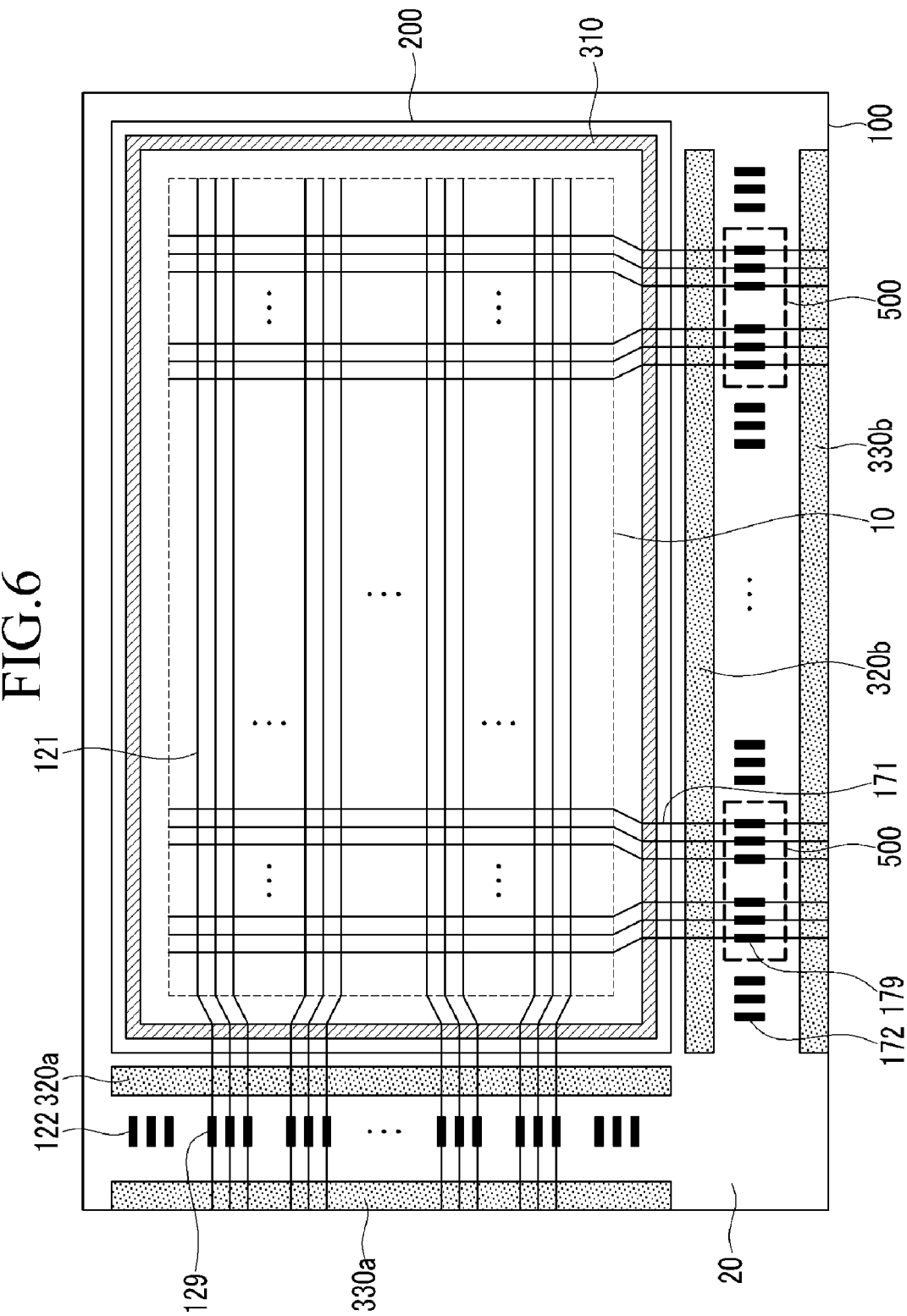
FIG. 6 is a plan view of an LCD according to another exemplary embodiment of the present invention.
Figure 7:
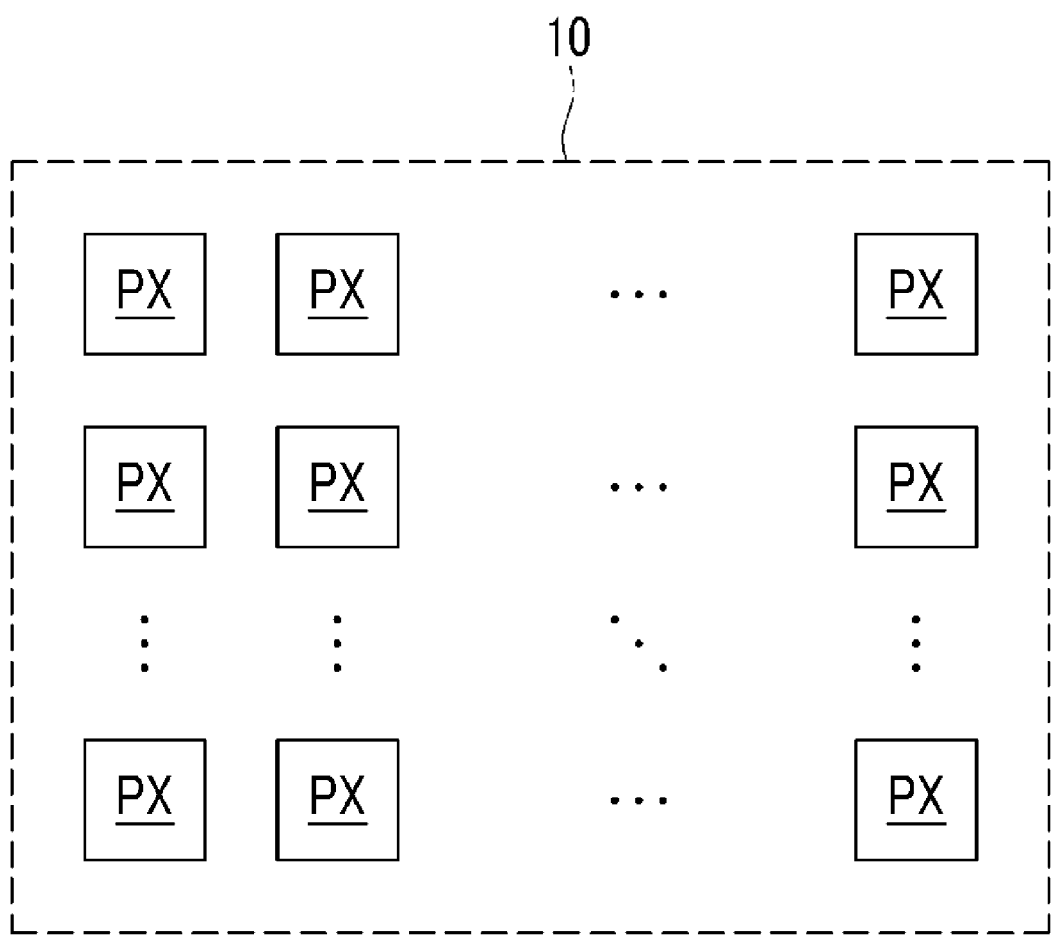
FIG. 7 is a layout view of a display area of an LCD according to an exemplary embodiment of the present invention.

FIG. 1 is a plan view of an LCD according to an exemplary embodiment of the present invention. FIG. 2 is an enlarged plan view of portion A of the LCD shown in FIG. 1. FIG. 3 is a cross-sectional view of the LCD shown in FIG. 2 taken along the line III-III. FIG. 4 is an enlarged plan view of portion B of the LCD shown in FIG. 1. FIG. 5 is a cross-sectional view of the LCD shown in FIG. 4 taken along the line V-V. FIG. 6 is a plan view of an LCD according to another exemplary embodiment of the present invention. FIG. 7 is a layout view of a display area of an LCD according to an exemplary embodiment of the present invention.

Referring to FIG. 1 and FIG. 7, an LCD includes a display area 10 to display images and a peripheral area 20 surrounding the display area 10. As shown in FIG. 3, the LCD includes a lower panel 100 and an upper panel 200 that face each other and a liquid crystal layer 3 that is interposed between the panels 100 and 200. The upper panel 200 has a smaller area than the lower panel 100.

First, the display area 10 will be described with reference to FIG. 1 and FIG. 7.

The display area 10 includes a plurality of signal lines and a plurality of pixels PX connected thereto and arranged in an approximate matrix format.

The signal lines provided in the lower panel 100 include a plurality of gate lines 121 to transmit gate signals and a plurality of data lines 171 to transmit a data voltage. The gate lines 121 are arranged parallel to each other and extend approximately in a row fashion, and the data lines 171 are arranged parallel to each other and extend approximately in a column fashion.

Each pixel PX includes a switching element (not shown) connected to the gate lines 121 and the data lines 171, a pixel electrode (not shown) connected to the switching element and arranged in the lower panel 100, a common electrode 270 arranged in the upper is panel 200, and the liquid crystal layer 3. The pixel electrode receives the data voltage through the switching element. The common electrode 270 may be arranged on the whole surface of the upper panel 200 and receives a common voltage. The liquid crystal layer 3 has a dielectric anisotropy, and the liquid crystal molecules of the liquid crystal layer 3 may be aligned such that their major axes are perpendicular to the surfaces of the two display panels in the absence of an applied electric field.

For color display, each pixel PX uniquely displays one of three primary colors (spatial division), or each pixel PX alternately displays the three primary colors as time passes (temporal division). A desired color is expressed as a spatial or a temporal sum of the primary colors: red, green, and blue. Each pixel PX may include a color filter representing one of the primary colors at the region of the upper panel 200 corresponding to each pixel electrode or on or under the pixel electrode of the lower panel 100.

Next, the peripheral area 20 will be described with reference to FIG. 1, FIG. 2, FIG. 3, FIG. 4, FIG. 5, and FIG. 6.

The peripheral area 20 includes a portion of the gate line 121, an end portion 129 of the gate line 121, a dummy gate conductor 122, a portion of the data line 171, an end portion 179 of the data line 171, a dummy data conductor 172, a sealant 310, and spacer regions 320a, 320b, 330a, and 330b. The portion of peripheral area 20 where the sealant 310 is arranged is covered by the upper panel 200, and the remaining region is exposed since it is not covered by the upper panel 200.

A portion of the gate line 121 and the end portion 129 are arranged on the insulation substrate 110 and may be wide enough for connecting with other layers or a gate driver (not shown). Referring to FIG. 1, the end portion 129 is disposed on the left side of the is display area 10 but may be disposed on the right side as well and may be disposed on or under the display area 10 depending on arrangement of the gate lines 121. The dummy gate conductor 122 may be positioned neighboring and parallel to the end portion 129.

A gate insulating layer 140 is arranged on a portion of the gate line 121 and the end portion 129.

A portion of the data line 171 and the end portion 179 are arranged on the gate insulating layer 140. The end portion 179 may also have an area wide enough for connecting with other layers or a data driver 500. Referring to FIG. 1, the end portion 179 may be disposed upward with reference to the display area 10, downward with reference to the display area 10 as shown in FIG. 6, or disposed on the right or left sides of the display area 10 according to the arrangement of the data line 171. The dummy data conductor 172 may be positioned neighboring and parallel to the end portion 179.

A semiconductor layer (not shown) that may be made of amorphous or crystallized silicon may be arranged between the gate insulating layer 140 and a portion of the data line 171 and the end portion 179. A passivation layer 180 is arranged on a portion of the data line 171 and the end portion 179. The passivation layer 180 has a contact hole 182 exposing the end portion 179, and the passivation layer 180 and the gate insulating layer 140 have a contact hole 181 exposing the end portion 129.

Contact assistants 81 and 82 are arranged on the passivation layer 180. The contact assistants 81 and 82 may be made of a transparent conductive material such as indium tin oxide (ITO), indium zinc oxide (IZO), or a metal such as aluminum, silver, chromium, or alloys thereof.

The gate driver (not shown) and the data driver 500 may be directly mounted as at is least one integrated circuit chip on the lower panel 100 and connected to the contact assistants 81 and 82. Alternatively, the gate driver and the data driver 500 may be provided on a flexible printed circuit film (not shown) in a tape carrier package (TCP) type and attached to the lower panel 100 to be connected to the contact assistants 81 and 82.

The sealant 310 couples the lower panel 100 to the upper panel 200, encloses the liquid crystal layer 3, and circumferentially surrounds the display area 10.

The upper panel 200 includes an insulation substrate 210, a light-blocking member 220 arranged on the insulation substrate 210, an overcoat 250, and the common electrode 270 arranged on the whole surface of the upper panel 200. The common electrode 270 may be made of a transparent conductor such as ITO or IZO.

The spacer regions 320a, 320b, 330a, and 330b include a first gate spacer region 320a, a second gate spacer region 330a, a first data spacer region 320b, and a second data spacer region 330b.

Referring to FIG. 1, FIG. 2, and FIG. 3, the first gate spacer region 320a is arranged along the end portions 129 and is disposed between the end portions 129 and the sealant 310. The first gate spacer region 320a includes at least one spacer 321a. The distance Lb between the first gate spacer region 320a and the sealant 310 may be from 100 μm to 900 μm or may be from 300 μm to 700 μm. The distance La between the first gate spacer region 320a and the end portion 129 or the contact assistants 81 may also be from 100 μm to 900 μm or from 300 μm to 700 μm.

The second gate spacer region 330a is arranged along the end portions 129 and between the end portions 129 and the edge of the lower panel 100. The second gate spacer region 330a includes at least one spacer 331a. The distance Lc between the second gate spacer is region 330a and the end portion 129 or the contact assistant 81 may also be from 100 μm to 900 μm or from 300 μm to 700 μm.

The first data spacer region 320b is arranged along the end portions 179 and between the end portions 179 and the sealant 310. The first data spacer region 320b includes at least one spacer 321b. The distance Lb' between the first data spacer region 320b and the sealant 310 may be from 100 μm to 900 μm or from 300 μm to 700 μm. The distance La' between the first data spacer region 320b and the end portion 179 or the contact assistants 82 may also be from 100 μm to 900 μm or from 300 μm to 700 μm.

The second data spacer region 330b is arranged along the end portions 179 and between the end portions 179 and the edge of the lower panel 100. The second data spacer region 330b includes at least one spacer 331b. The distance Lc' between the second data spacer region 330b and the end portion 179 or the contact assistants 82 may also be from 100 μm to 900 μm or from 300 μm to 700 μm.

The spacers 321a, 321b, 331a, and 331b may be column spacers and may have a uniform interval between them. The spacers 321a, 321b, 331a, and 331b may be arranged on the lower panel 100 and extend toward the upper panel 200, and an upper portion of the spacers 321a, 321b, 331a, and 331b may extend to the upper panel 200. Referring to FIG. 3 and FIG. 5, although upper panel 200 is not shown as disposed on the spacer regions 320a, 320b, 330a, and 330b, a portion of the upper panel 200 may be on at least a portion of the spacer regions 320a, 320b, 330a, and 330b.

The spacers 321a, 321b, 331a, and 331b maintain the distance between the lower panel 100 and the upper panel 200 such that the contact assistants 81 and 82 and the common electrode 270 do not contact during the manufacturing process of the LCD. The second spacer is regions 330a and 330b may be omitted.

Referring to FIG. 6, in the LCD according to another exemplary embodiment of the present invention, the end portion 179, the first data spacer 320b, and the second data spacer 330b are disposed outside of the display area 10.

Figure 8:
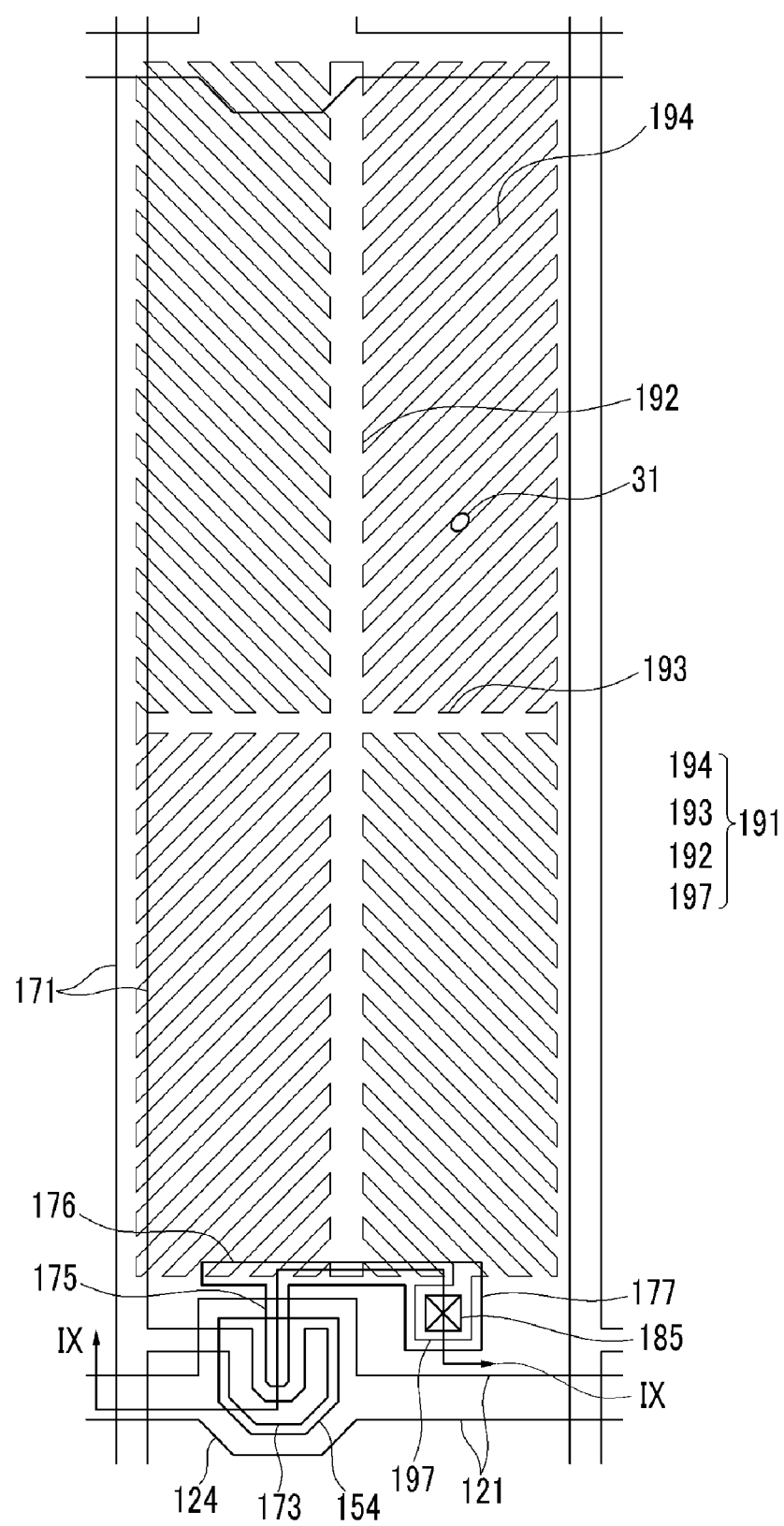
FIG. 8 is a layout view of one pixel of an LCD according to an exemplary embodiment of the present invention.
Figure 9:
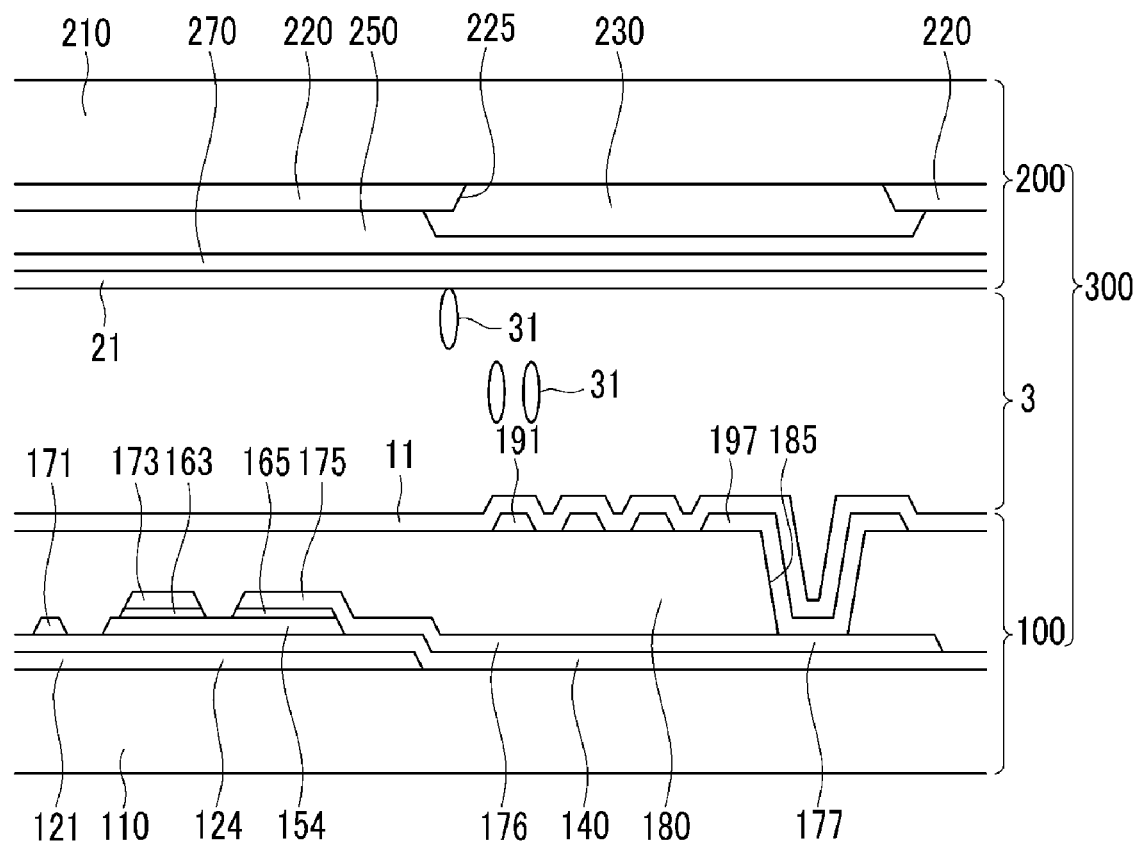
FIG. 9 and FIG. 10 are cross-sectional views of the LCD of FIG. 8 taken along the line IX-IX, showing different alignment states of several liquid crystal molecules.
Figure 10:
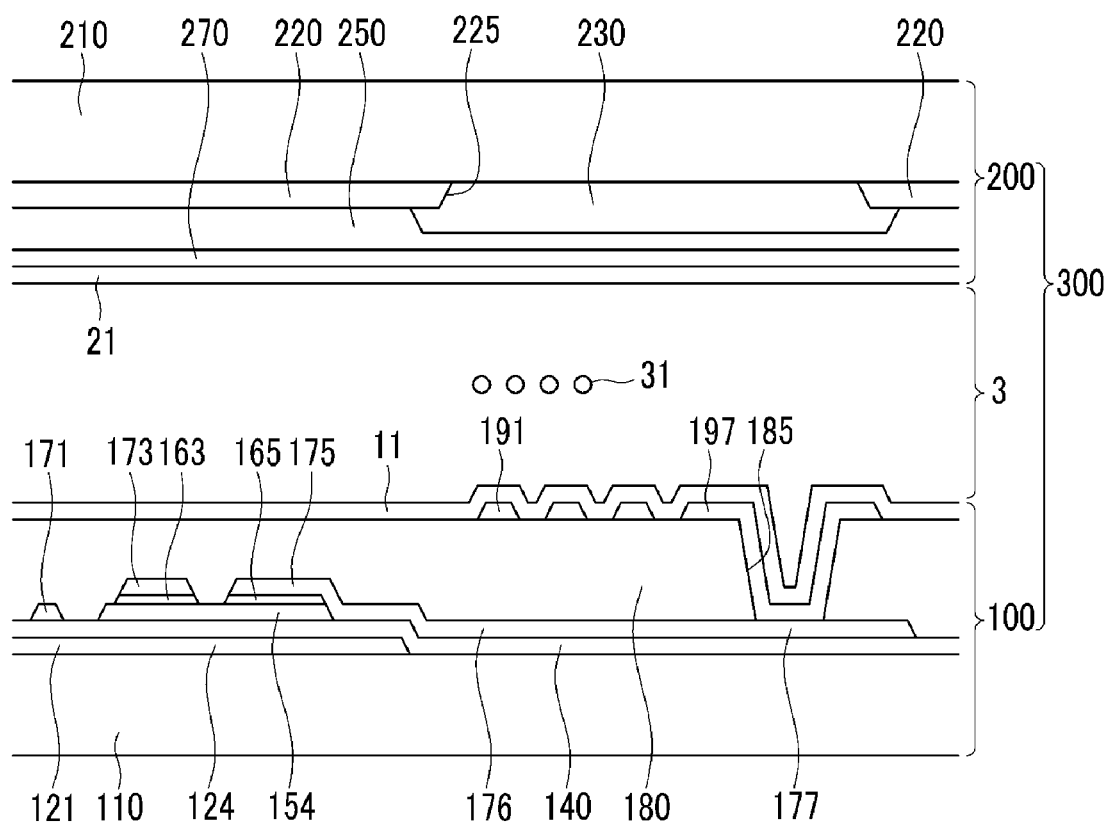

Referring to FIG. 8, FIG. 9, and FIG. 10, one pixel PX of an LCD will be described.

FIG. 8 is a layout view of one pixel of an LCD according to an exemplary embodiment of the present invention. FIG. 9 and FIG. 10 are cross-sectional views of the LCD of FIG. 8 taken along the line IX-IX, showing different alignment states of several liquid crystal molecules.

A liquid crystal panel assembly includes a lower panel 100 and an upper panel 200 facing each other and a liquid crystal layer 3 interposed between the display panels 100 and 200.

First, the lower panel 100 will be described.

A gate line 121 including a gate electrode 124 is arranged on an insulation substrate 110. A gate insulating layer 140 is arranged on the gate line 121, and a semiconductor island 154 made of hydrogenated amorphous silicon (a-Si) or polysilicon is arranged on the gate insulating layer 140.

Ohmic contact islands 163 and 165 are arranged on the semiconductor island 154. The ohmic contact islands 163 and 165 may be made of n+hydrogenated a-Si heavily doped with an N-type impurity such as phosphorous or may be made of a silicide.

A data line 171 and a drain electrode 175 are arranged on the ohmic contacts 163 and 165 and the gate insulating layer 140. The data line 171 includes a source electrode 173 is extending toward the gate electrode 124 and has a U-shape. The drain electrode 175 includes a longitudinal portion facing the source electrode 173 with respect to the gate electrode 124, a transverse portion 176 intersecting the longitudinal portion and extending parallel to the gate line 121, and an expansion 177 disposed at one end of the transverse portion 176 and having an area wide enough to accommodate connection with other layers.

A gate electrode 124, a source electrode 173, and a drain electrode 175 form a thin film transistor (TFT) along with a semiconductor island 154, and the channel of the TFT is in the semiconductor island 154 between the source electrode 173 and the drain electrode 175.

The ohmic contacts 163 and 165 are interposed between the underlying semiconductor islands 154 and the overlying data lines 171 and the drain electrodes 175, thereby reducing contact resistances.

A passivation layer 180 made of an organic or inorganic insulator is arranged on the data lines 171, the drain electrodes 175, and the exposed semiconductor islands 154. The passivation layer 180 has a contact hole 185 exposing the expansion 177 of the drain electrode 175.

A plurality of pixel electrodes 191 made of a transparent conductive material such as ITO or IZO or made of a reflective metal such as aluminum, silver, chromium, or an alloy thereof are arranged on the passivation layer 180.

The overall shape of the pixel electrode 191 is a quadrangle and includes a transverse stem 193, a longitudinal stem 192 intersecting the transverse stem 193, a plurality of minute branches 194, and a lower protrusion 197. The pixel electrode 191 is divided into four sub-regions by the transverse stem 193 and the longitudinal stem 192. The minute branches 194 obliquely extend from the transverse stem 193 and the longitudinal stem 192, and the extension is direction makes an angle of about 45° or 135° with the gate line 121 or the transverse stem 193. Also, the minute branches 194 of two neighboring sub-regions may be crossed.

The lower protrusion 197 of the pixel electrode 191 is connected to the drain electrode 175 through the contact hole 185, thereby receiving the data voltage from the drain electrode 175.

An alignment layer 11 is arranged on the pixel electrode 191.

Next, the upper panel 200 will be described.

A light-blocking member 220 is arranged on the substrate 210. The light-blocking member 220 prevents light leakage between neighboring pixels and includes a plurality of openings 225 defining the regions facing the pixel electrodes 191.

A color filter 230 is arranged on the substrate 210 and the light-blocking member 220. Most of the color filter 230 is disposed in regions enclosed by the light-blocking members 220.

An overcoat 250 is arranged on the color filters 230 and the light-blocking member 220, and a common electrode 270 that may be made of a transparent conductor such as ITO or IZO is arranged on the whole surface of the overcoat 250.

An alignment layer 21 is arranged on the common electrode 270. The alignment layers 11 and 21 may be vertical alignment layers.

The liquid crystal layer 3 between the lower panel 100 and the upper panel 200 includes the liquid crystal molecules 31 having a negative dielectric anisotropy. With an applied electric field, the liquid crystal molecules 31 are initially aligned to be pretilted in a direction substantially parallel to the length direction of the minute branches 194. However when an electric field is not applied across the liquid crystal layer, the liquid crystal molecules 31 is disposed near the surface of the display panels 100 and 200 may be aligned such that their long axes are perpendicular to the surface of the two display panels 100 and 200.

Next, operation of the LCD will be described with reference to FIG. 8, FIG. 9, and FIG. 10.

FIG. 10 is a cross-sectional view of the LCD of FIG. 8 taken along the line IX-IX showing the liquid crystal layer in the presence of an applied electric field.

When the gate line 121 is applied with a gate signal, the data voltage is applied to the pixel electrode 191 through the data line 171 such that the pixel electrode 191 and the common electrode 270 applied with the common voltage generate an electric field across the liquid crystal layer 3. Thus, as shown in FIG. 10, the liquid crystal molecules 31 are inclined in a pretilted direction in response to the applied electric field, and the polarization of the incident light through the liquid crystal layer 3 is rotated according to the inclination angles of the liquid crystal molecules. This change of the polarization affects the amount of light transmitted by the polarizer, thereby producing displayed images of the LCD.

Next, one pixel of an LCD according to another exemplary embodiment of the present invention will be described with reference to FIG. 11.

Figure 11:
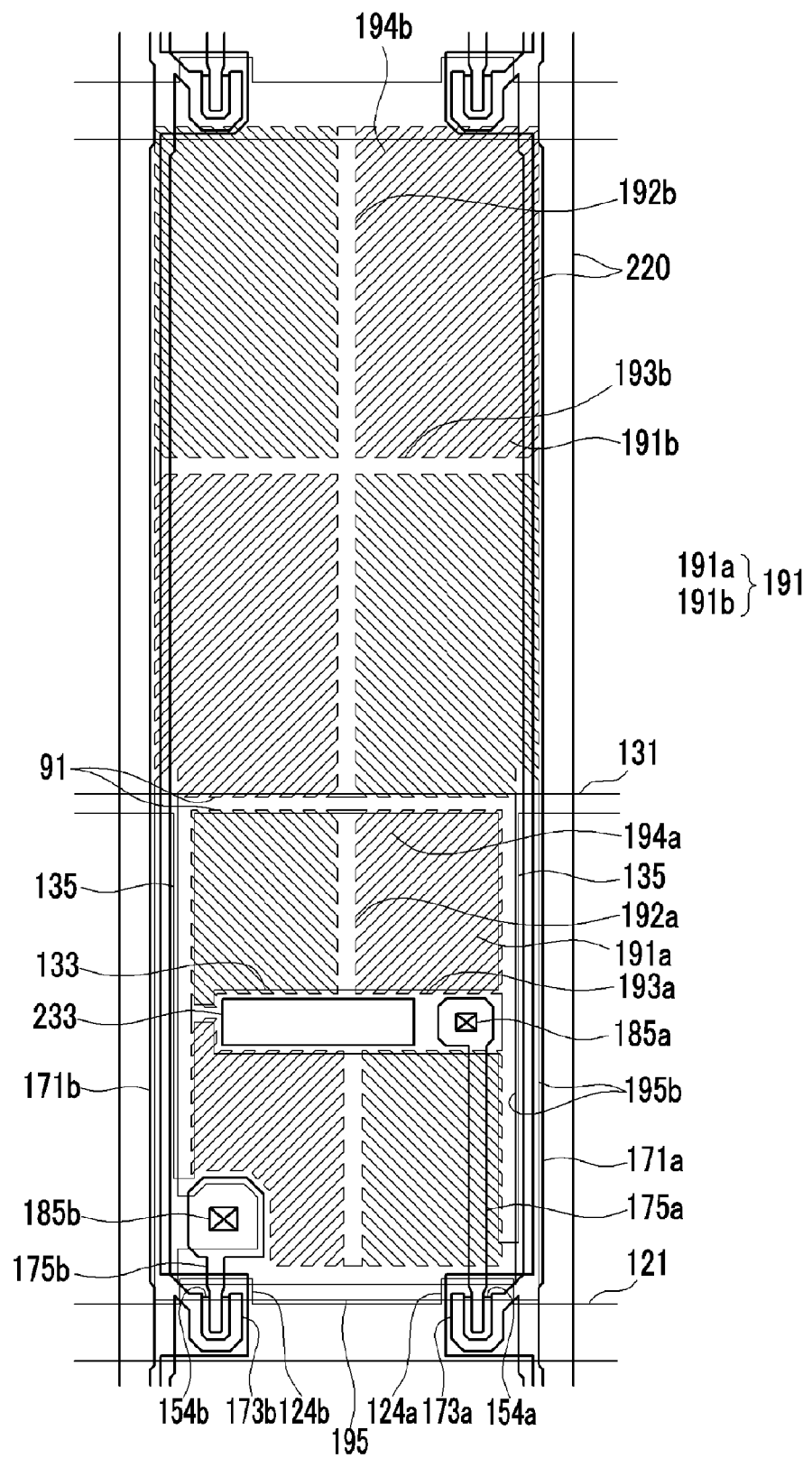
FIG. 11 is a layout view of one pixel of an LCD according to another exemplary embodiment of the present invention.

FIG. 11 is a layout view of a pixel of an LCD. The layered structure of the LCD is similar to the layered structure of the LCD shown in FIG. 8 and FIG. 9. A gate line 121 and a storage electrode line 131 are arranged on a substrate (not shown). The gate line 121 includes a first gate electrode 124a and a second gate electrode 124b, and the storage electrode line 131 includes right and left longitudinal portions 135 extending downward from the storage electrode line 131 and a storage electrode 133. The storage electrode 133 is wide enough for overlapping with a pixel electrode 191 (described below).

A gate insulating layer (not shown) is arranged on the gate line 121 and the storage electrode line 131, and a first semiconductor 154a and a second semiconductor 154b are arranged on the gate insulating layer.

Ohmic contacts (not shown) are arranged on the semiconductors 154a and 154b, and data lines 171a and 171b and drain electrodes 175a and 175b are arranged on the ohmic contacts and the gate insulating layer.

A passivation layer (not shown) is arranged on the data lines 171a and 171b, the drain electrodes 175a and 175b, and the exposed semiconductors 154a and 154b. The passivation layer has contact holes 185a and 185b exposing the first drain electrode 175a and the second drain electrode 175b.

A light-blocking member 220 is arranged on the passivation layer. The light-blocking member 220 prevents light leakage between pixels and may include a portion extending upward and downward on the passivation layer and a quadrangular portion corresponding to the TFT.

A color filter (not shown) is arranged on the passivation layer and the light-blocking member 220. Most of the color filter is arranged in the region enclosed by the light-blocking member 220 and includes an opening 233 arranged on the storage electrode 133. An overcoat (not shown) may be arranged on the color filter and the light-blocking member 220.

A pixel electrode 191 is arranged on the color filter and the light-blocking member 220 and includes a first subpixel electrode 191a and a second subpixel electrode 191b that are separated from each other by a gap 91.

The second subpixel electrode 191b includes a connection bridge 195b enclosing the first subpixel electrode 191a and extending to the second drain electrode 175b. The second subpixel electrode 191b receives the data voltage from the second drain electrode 175b through the connection bridge 195b.

Both longitudinal edges of the connection bridge 195b cover the data lines 171a and 171b and prevent crosstalk between the data lines and the first subpixel electrode 191a.

The first and second subpixel electrodes 191a and 191b include longitudinal stems 192a and 192b, and transverse stems 193a and 193b, and minute branches 194a and 194b. The liquid crystal molecules of the liquid crystal layer (not shown) are aligned via an applied electric field and initially pretilted parallel to the length directions of the minute branches 194a and 194b.

Next, a method of initially aligning the liquid crystal molecules of a liquid crystal layer to have a pretilted alignment in a manufacturing process of an LCD according to an exemplary embodiment of the present invention will be described with reference to FIG. 8, FIG. 9, FIG. 10, FIG. 11, and FIG. 12.

Generally, a method for providing a pretilt to the liquid crystal that is sustained in the absence of an electric field may improve the response speed of the liquid crystal while realizing wide viewing angle of an LCD. For liquid crystal molecules to have a pretilt in various directions, alignment layers having various alignment directions may be used, or the liquid crystal layer may be applied in the presence of an electric field and a thermal- or light-hardened material added. In the case of light-hardened material being applied, light irradiates the structure to produce alignment of the liquid crystal molecules.

Figure 12:
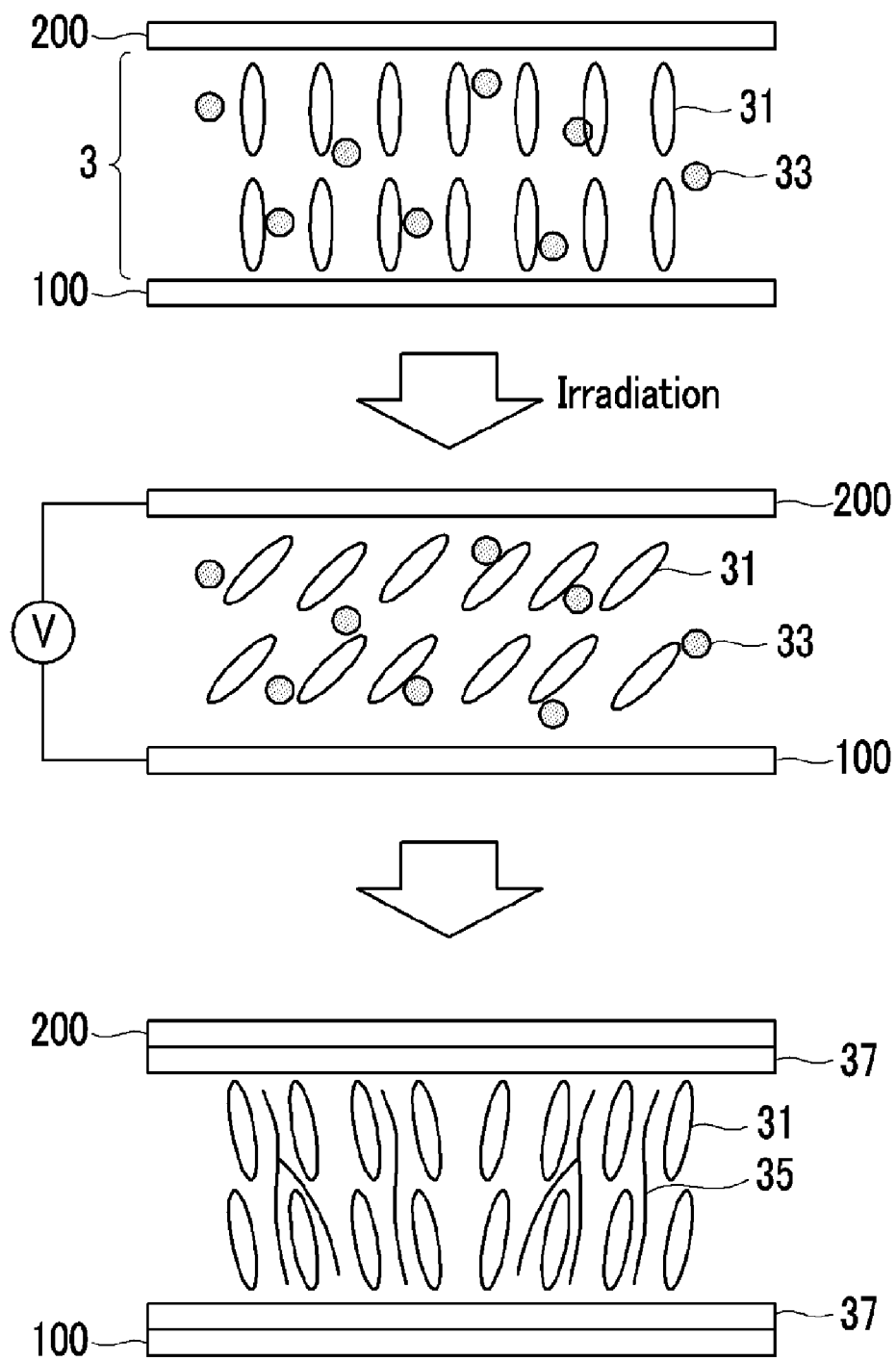
FIG. 12 is a view showing a process of providing a pretilt to liquid crystal molecules by using a photopolymerizable prepolymer.

FIG. 12 is a view showing a process providing a pretilt alignment to liquid crystal molecules by using a photopolymerizable prepolymer.

First, a prepolymer 33 such as a monomer that may be polymerized and hardened is through photopolymerization, for example, by ultraviolet irradiation, is injected with the liquid crystal material between the upper display panel 200 and the lower display panel 100. The prepolymer 33 may be a reactive mesogen.

As shown in FIG. 12, in the absence of an applied electric field, the liquid crystal molecules 31 initially exhibit an alignment perpendicular to the panels 100 and 200. When the data voltage is applied to the pixel electrode 191 and the common voltage is applied to the common electrode 270, an electric field is generated across the liquid crystal layer 3, and the liquid crystal molecules 31 tend to tilt and exhibit an alignment more parallel to the panels 100 and 200. Near the edges of the minute branches 194a and 194b, the electric field has a horizontal component, and the liquid crystal molecules 31 that tend to align in opposite directions tilt parallel to the length direction of the minute branches 194a and 194b.

Next, as the electric field is applied across the liquid crystal layer 3, the prepolymer 33 is irradiated with, for example, ultraviolet light to cause polymerization such that a first polymer 35 and a second polymer 37 are formed as shown in FIG. 12. Upon polymerization, the first polymer 35 is arranged in the liquid crystal layer 3, and the second polymer 37 is arranged close to the display panels 100 and 200. The alignment direction of the liquid crystal molecules 31 have a pretilt in the length direction of the minute branches 194a and 194b due to the presence of the first and second polymers 35 and 37.

Now, a manufacturing method of an LCD including a method of applying a voltage to the lower panel 100 and the upper panel 200 in an initial alignment process of liquid crystal molecules will be described with reference to FIG. 13, FIG. 14, FIG. 15, FIG. 16, FIG. 17, FIG. 18, FIG. 19, and FIG. 20.

Figure 19:
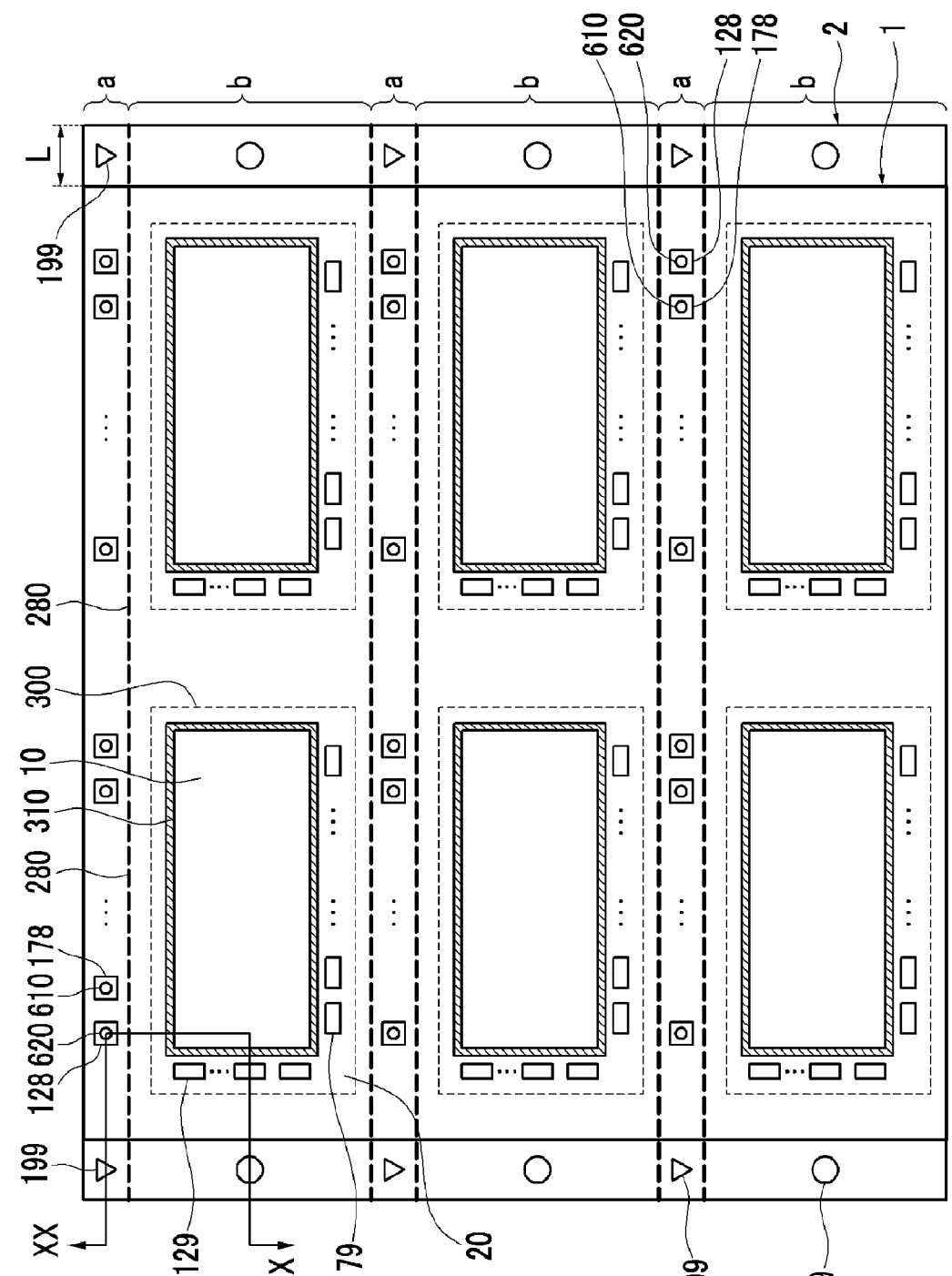
FIG. 19 is a layout view of a lower mother substrate and an upper mother substrate in a manufacturing method of an LCD according to an exemplary embodiment of the present invention.
Figure 20:
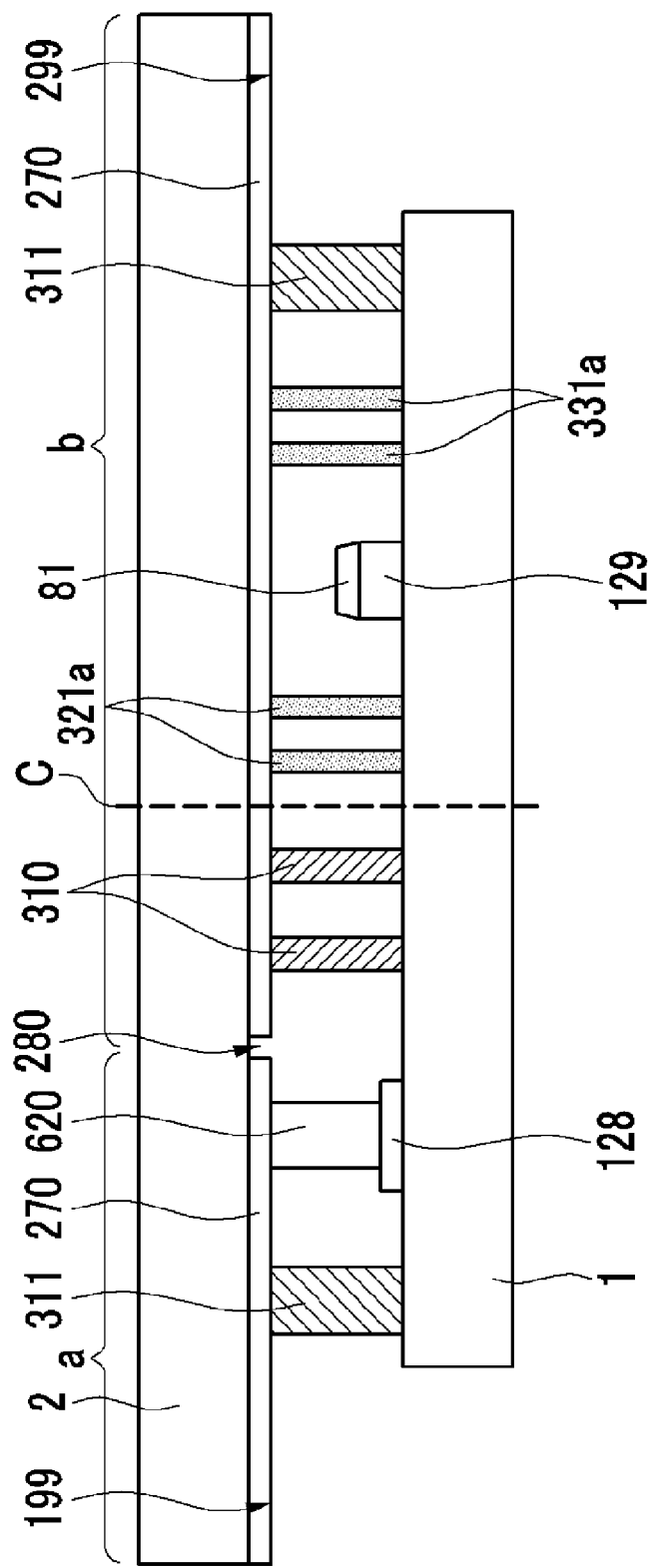
FIG. 20 is a cross-sectional view of the lower mother substrate and the upper mother substrate shown in FIG. 19 taken along the line XX-XX.

FIG. 13, FIG. 14, FIG. 15, FIG. 16, FIG. 17, and FIG. 18 are views sequentially is showing a portion of a manufacturing method of an LCD according to an exemplary embodiment of the present invention. FIG. 19 is a layout view of a lower mother substrate and an upper mother substrate in a manufacturing method of an LCD according to an exemplary embodiment of the present invention, and FIG. 20 is a cross-sectional view of the lower mother substrate and the upper mother substrate shown in FIG. 19 taken along the line XX-XX.

Figure 13:
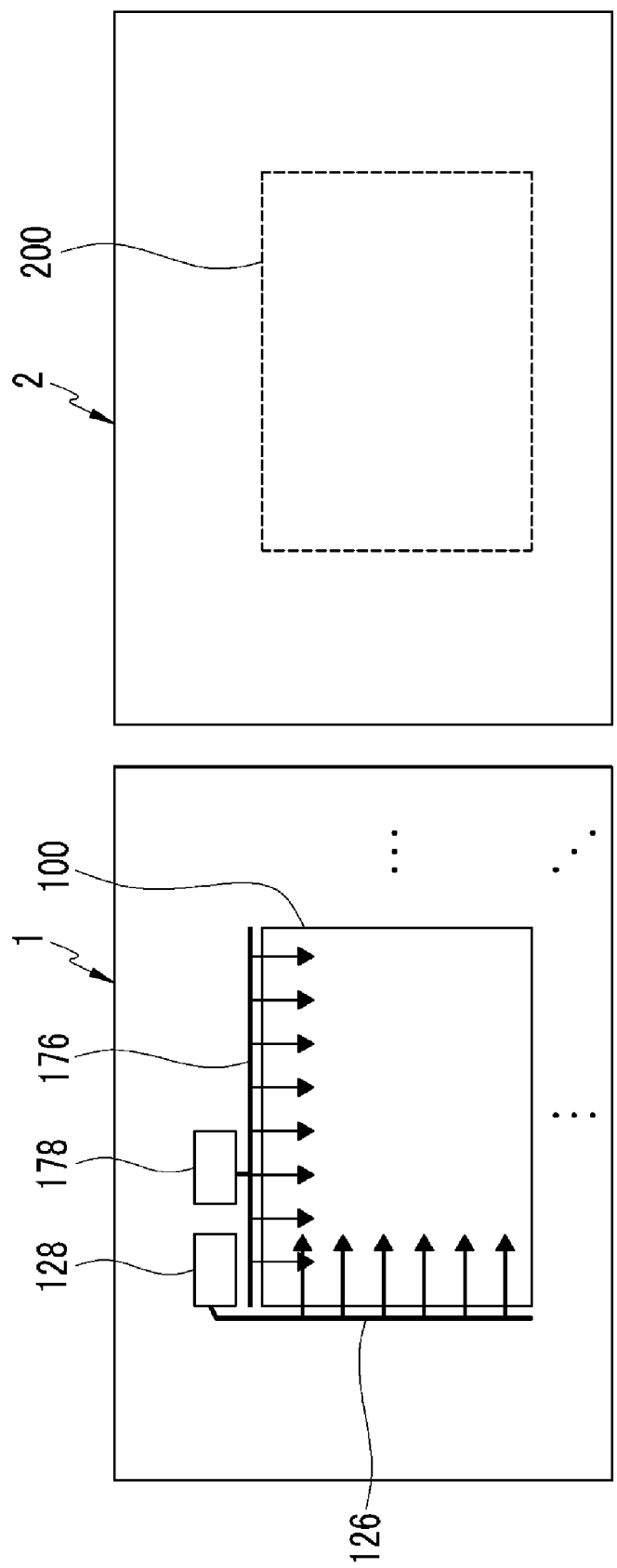
FIG. 13, FIG. 14, FIG. 15, FIG. 16, FIG. 17, and FIG. 18 are views sequentially is showing portions of a manufacturing method of an LCD according to an exemplary embodiment of the present invention.

First, referring to FIG. 13, a lower mother substrate 1 including a plurality of insulation substrates arranged in a matrix format and connected to each other is provided, and display elements and driving elements such as a plurality of gate lines, a plurality of data lines, a plurality of switching elements, and a plurality of pixel electrodes are arranged to complete a plurality of lower panels 100. Testing pads 128 and 178 to apply a testing signal are arranged on the periphery of the lower panel 100, and the testing pads 128 and 178 are connected to the gate line and the data line of the lower panel 100 through testing signal lines 126 and 176.

Also, an upper mother substrate 2 including a plurality of insulation substrates arranged in a matrix format and connected to each other is provided, and thin films such as a common electrode are deposited thereon to complete a plurality of upper panels 200.

Figure 14:
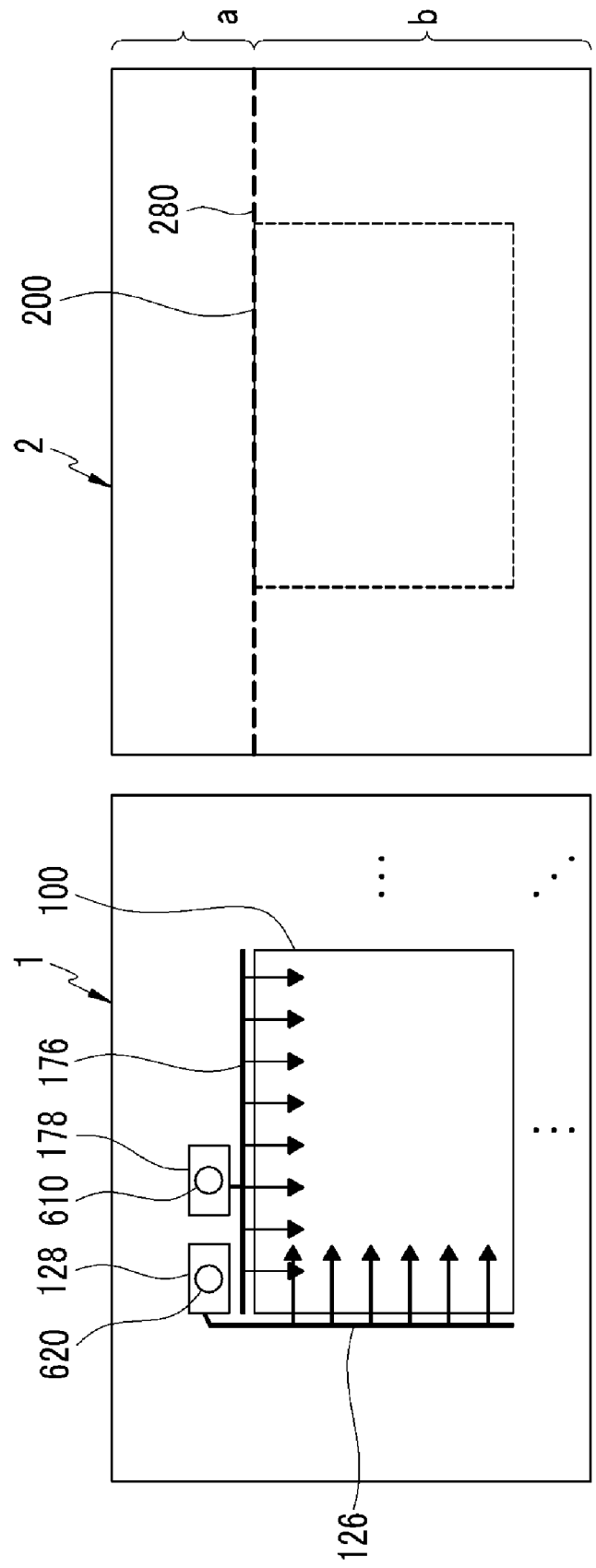

Next, as shown in FIG. 14, shorting portions 620 and 610 are arranged on the testing pads 128 and 178. The shorting portions 620 and 610 may be arranged on the upper panel 200, and in this case, the shorting portions 620 and 610 may be positioned at locations corresponding to the testing pads 128 and 178 of the lower panel 100.

Also, as shown in FIG. 14, FIG. 19, and FIG. 20, the common electrode 270 of the upper mother substrate 2 is cut along the common electrode cutting line 280. Accordingly, the common electrode 270 is divided into a first region a and a second region b that are electrically insulated from each other.

Figure 15:
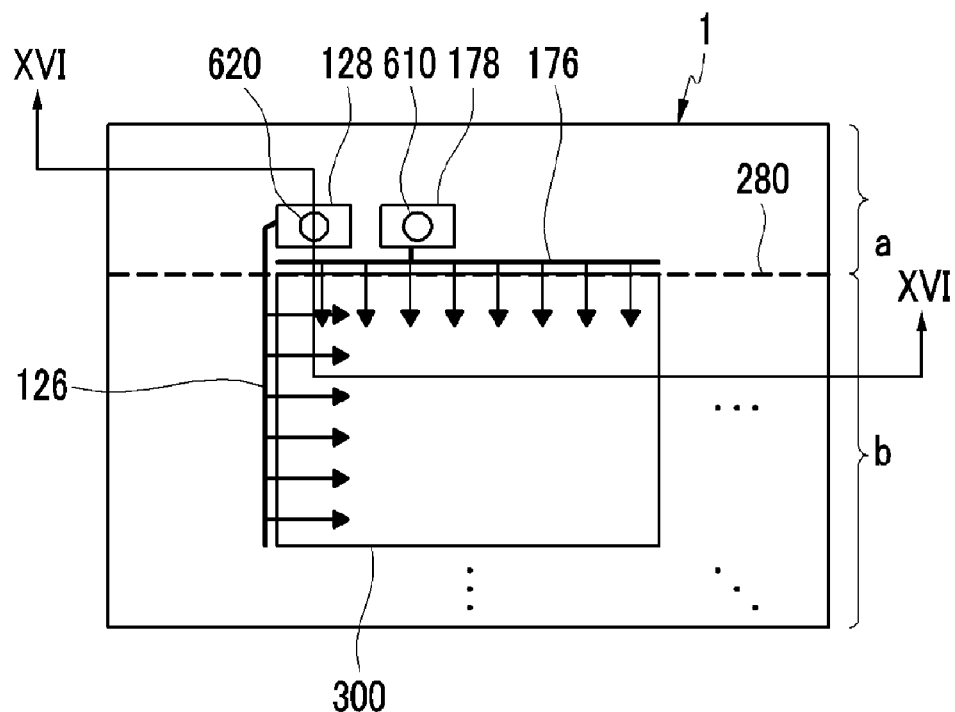
Figure 16:
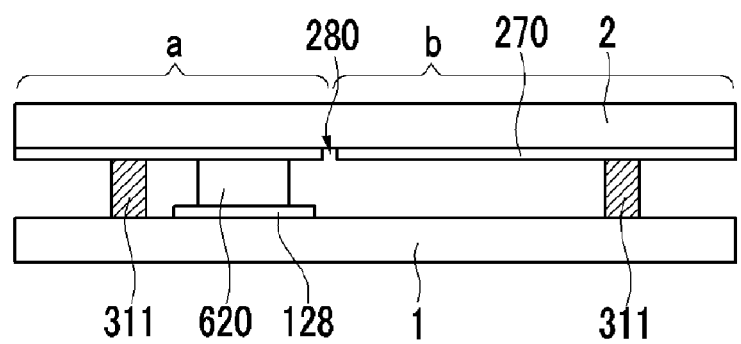

Next, referring to FIG. 15 and FIG. 16, an outer sealant 311 is arranged on one of the lower mother substrate 1 and the upper mother substrate 2. Then the liquid crystal material is inserted into the region enclosed by the outer sealant 311 to form a liquid crystal layer 3, and the two mother substrates 1 and 2 are aligned. Then uniform pressure is applied to couple the two mother substrates 1 and 2. Accordingly, the lower panel 100 and the upper panel 200 comprise a liquid crystal panel assembly 300 along with the liquid crystal layer 3 therebetween. Here, the testing pads 128 and 178 and the shorting portions 620 and 610 are positioned to correspond to the first region a of the upper mother substrate 2.

Figure 17:
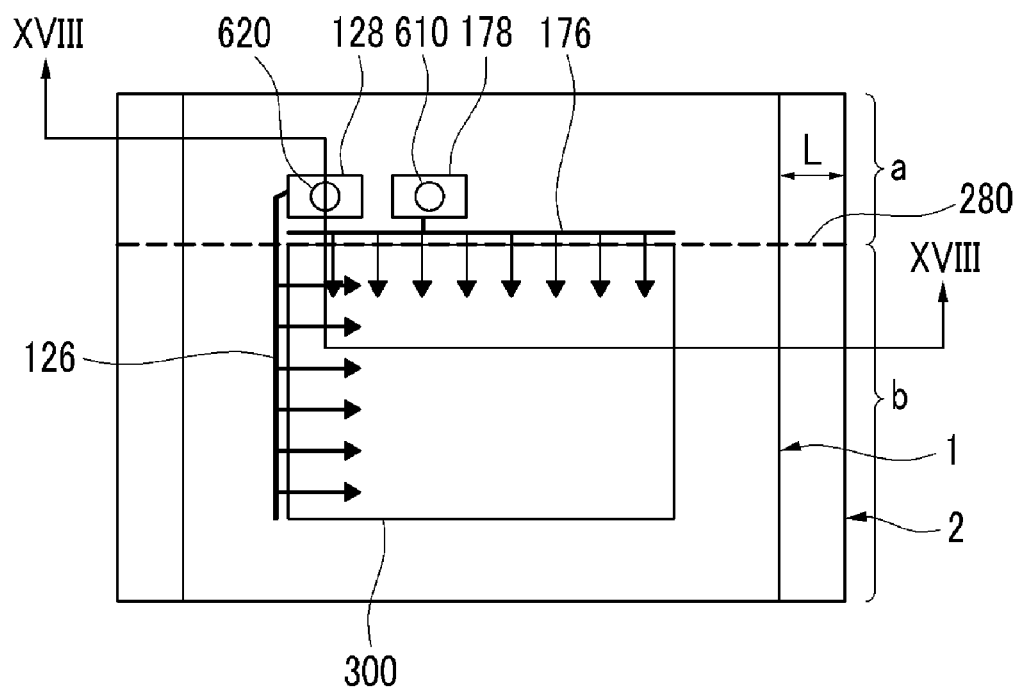
Figure 18:
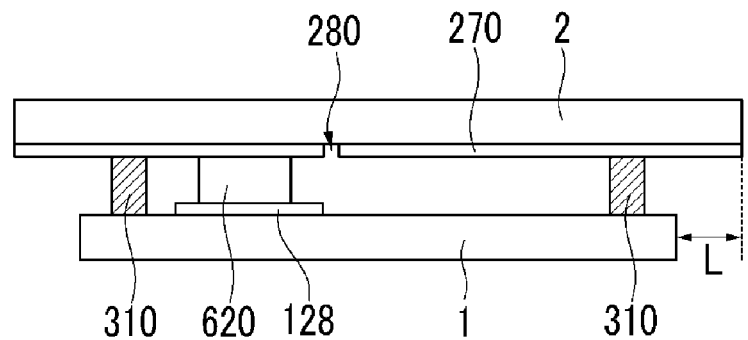

Next, as shown in FIG. 17 and FIG. 18, edge portions L of the lower mother substrate 1 are removed to expose the edge portion of the upper mother substrate 2, thereby resulting in the relative arrangement of the lower mother substrate 1 and the upper mother substrate 2 as shown in FIG. 18.

Referring to FIG. 19 and FIG. 20, each liquid crystal panel assembly 300 includes the display area 10 and the peripheral area 20. The sealant 310, the end portion 129, and the end portion 179 are arranged in the peripheral area 20. Various characteristics of the exemplary embodiments shown in FIG. 1, FIG. 2, FIG. 3, FIG. 4, FIG. 5, and FIG. 6 may be applied to the liquid crystal panel assembly 300.

In FIG. 19, a voltage application unit 199 is represented as a triangle, and a voltage application unit 299 is represented as a circle. The voltage application units 199 and 299 are positioned in the first region a and the second region b, respectively, of the portion L.

Referring to FIG. 20, a voltage applied to the voltage application unit 199 biases the common electrode 270 at the first region a, the testing pads 128 and 178, and the shorting portions 620 and 61. The voltage may be also applied to the gate line or the data line through the is testing signal lines 126 and 176 such that the voltage is applied to the pixel electrode of each pixel PX. Additionally, a voltage applied through the voltage application unit 299 is transmitted to the common electrode 270 at the second region b.

As described above, if the voltage is applied to the voltage application unit 199 and the voltage application unit 299, an electric field is applied to the liquid crystal layer 3 between the two mother substrates 1 and 2, and radiation such as ultraviolet light may irradiate a plurality of liquid crystal panel assemblies 300 so that the liquid crystal layers 3 may simultaneously undergo initial alignment, thereby reducing the manufacturing time and cost of the LCD.

Referring to FIG. 1, FIG. 2, FIG. 3, FIG. 4, FIG. 5, FIG. 19, and FIG. 20, at least one spacer 321a may be arranged between the sealant 310 of the liquid crystal panel assembly 300 and the end portion 129 or the contact assistant 81. Also, at least one spacer 331a may be arranged between the end portion 129 or the contact assistant 81 and the outer sealant 311. Likewise, at least one spacer 321b may be arranged between the sealant 310 of the liquid crystal panel assembly 300 and the end portion 179 or the contact assistant 82, and at least one spacer 331b may be arranged between the end portion 179 or the contact assistant 82 and the outer sealant 311. The spacers 321a, 331a, 321b, and 331b arranged near the end portion 129 or the end portion 179 may be arranged on the lower mother substrate 1 or the upper mother substrate 2 before coupling the two mother substrates 1 and 2. These spacers 321a, 331a, 321b, and 331b may maintain the distance between the two mother substrates 1 and 2 such that the common electrode 270 does not contact the end portion 129, the contact assistant 81, the end portion 179, or the contact assistant 82.

If the common electrode 270 contacts the end portion 129, the contact assistant 81, the end portion 179, or the contact assistant 82, the voltage difference between the common electrode 270 and the pixel electrode is decreased in the initial alignment step of the liquid crystal layer 3, and the liquid crystal molecules may not be inclined to the desired angle of alignment.

Accordingly, the spacers 321a, 331a, 321b, and 331b may be arranged near the end portion 129 or the end portion 179 such that the distance between the mother substrates 1 and 2 may be maintained when initially aligning the liquid crystal layer 3 in a manufacturing process of the LCD. Therefore, a decrease in the voltage difference between the lower panel 100 and the upper panel 200 may be prevented so that a target voltage difference between the pixel electrode and the common electrode 270 may be maintained. Also, the various characteristics of the exemplary embodiments shown in FIG. 1, FIG. 2, FIG. 3, FIG. 4, and FIG. 5 may be applied to the present exemplary embodiment.

Finally, referring to FIG. 20, the lower mother substrate 1 and the upper mother substrate 2 are cut according to the cutting line C, thereby resulting in a plurality of liquid crystal panel assemblies 300. Here, the spacers 331a and 331b are included in the liquid crystal panel assembly 300 such that they may remain in the LCD of, for example, FIG. 1.

According to an exemplary embodiment of the present invention, the liquid crystal layers of a plurality of LCDs may be simultaneously initially aligned such that the manufacturing time and cost of the LCD may be reduced. Further, the spacers may be arranged near the end portion of the display signal line such as the gate line or the data line so that a voltage difference decrease between the upper panel and the lower panel may be prevented when initially aligning the liquid crystal layer.

It will be apparent to those skilled in the art that various modifications and is variations can be made in the present invention without departing from the spirit or scope of the invention. Thus, it is intended that the present invention cover the modifications and variations of this invention provided they come within the scope of the appended claims and their equivalents.

What is claimed is:

1. A liquid crystal display, comprising:
a first substrate and a second substrate facing each other;
a liquid crystal layer interposed between the first substrate and the second substrate;
a sealant coupling the first substrate and the second substrate and enclosing the liquid crystal layer;
a display signal line arranged on the first substrate and comprising an end portion; and
a first spacer disposed between the end portion of the display signal line and the sealant, the sealant being disposed between the first spacer and the liquid crystal layer.

2. The liquid crystal display of claim 1, wherein
at least one of a distance between the first spacer and the end portion of the display signal line and a distance between the first spacer and the sealant is in a range of 300 μm to 700 μm.

3. The liquid crystal display of claim 2, wherein
the first spacer is disposed along the end portion of the display signal line.

4. The liquid crystal display of claim 3, further comprising:
a second spacer disposed opposite the first spacer with respect to the end portion of the display signal line.

5. The liquid crystal display of claim 4, wherein
a distance between the second spacer and the end portion of the display signal line is in a range of 300 μm to 700 μm.

6. The liquid crystal display of claim 5, further comprising:
a pixel electrode arranged on the first substrate, connected to the display signal line, and comprising branches; and
a common electrode arranged on a surface of the second substrate that faces the first substrate.

7. The liquid crystal display of claim 6, further comprising:
an alignment layer arranged on the first substrate to align the liquid crystal molecules perpendicular to the first substrate,
wherein the liquid crystal layer comprises:
liquid crystal molecules;
a prepolymer; and
a polymer to align the liquid crystal molecules to be pretilted in a direction parallel to the length of the branches, wherein the prepolymer is irradiated to form the polymer.

8. The liquid crystal display of claim 1, wherein
the first spacer is disposed along the end portion of the display signal line.

9. The liquid crystal display of claim 8, further comprising:
a second spacer disposed opposite the first spacer with respect to the end portion of the display signal line.

10. The liquid crystal display of claim 9, wherein
the distance between the second spacer and the end portion of the display signal line is in a range of 300 μm to 700 μm.

11. The liquid crystal display of claim 10, further comprising:
a pixel electrode arranged on the first substrate, connected to the display signal line, and comprising branches; and
a common electrode arranged on a surface of the second substrate that faces the first substrate.

12. The liquid crystal display of claim 11, further comprising:
an alignment layer arranged on the first substrate to align the liquid crystal molecules perpendicular to the first substrate,
wherein the liquid crystal layer comprises:
liquid crystal molecules;
a prepolymer; and
a polymer to align the liquid crystal molecules to be pretilted in a direction parallel to the length of the branches, wherein the prepolymer is irradiated to form the polymer.

13. The liquid crystal display of claim 1, further comprising:
a second spacer disposed opposite the first spacer with respect to the end portion of the display signal line.

14. The liquid crystal display of claim 13, wherein
the distance between the second spacer and the end portion of the display signal line is in a range of 300 μm to 700 μm.

15. The liquid crystal display of claim 14, further comprising
a pixel electrode arranged on the first substrate, connected to the display signal line, and comprising branches; and
a common electrode arranged on a surface of the second substrate that faces the first substrate.

16. The liquid crystal display of claim 15, further comprising:
an alignment layer arranged on the first substrate to align the liquid crystal molecules perpendicular to the first substrate,
wherein the liquid crystal layer comprises:
liquid crystal molecules;
a prepolymer; and
a polymer to align the liquid crystal molecules to be pretilted in a direction parallel to the length of the branches, wherein the prepolymer is irradiated to form the polymer.

17. The liquid crystal display of claim 1, further comprising:
a pixel electrode arranged on the first substrate, connected to the display signal line, and comprising branches; and
a common electrode arranged on a surface of the second substrate that faces the first substrate.

18. The liquid crystal display of claim 17, further comprising:
an alignment layer arranged on the first substrate to align the liquid crystal molecules perpendicular to the first substrate,
wherein the liquid crystal layer comprises:
liquid crystal molecules; and
a polymer to align the liquid crystal molecules to be pretilted in a direction parallel to the length of the branches.

19. The liquid crystal display of claim 18, wherein
the polymer is arranged by irradiating a prepolymer.

* * * * *